(12) United States Patent
Park et al.

(10) Patent No.: US 8,573,648 B2
(45) Date of Patent: Nov. 5, 2013

(54) APPARATUS AND CONTROL METHOD FOR ROTATING WEBBING GUIDE OF SEAT BELT FOR VEHICLE

(75) Inventors: Woo Chul Park, Suwon-si (KR); Hyun Jeong You, Hwaseong-si (KR); Dong Sub Lee, Wonju-si (KR)

(73) Assignees: Hyundai Motor Company, Seoul (KR); Autoliv Development AB, Vargarda (SE)

( * ) Notice: Subject to any disclaimer, the term of this patent is extended or adjusted under 35 U.S.C. 154(b) by 0 days.

(21) Appl. No.: 13/428,650

(22) Filed: Mar. 23, 2012

(65) Prior Publication Data

US 2013/0088001 A1   Apr. 11, 2013

(30) Foreign Application Priority Data

Oct. 5, 2011   (KR) .................. 10-2011-0100997

(51) Int. Cl.
   *B60R 22/03*   (2006.01)
(52) U.S. Cl.
   USPC ........ 280/801.2; 280/802; 280/806; 280/807; 280/808; 297/481; 242/374; 242/375.1; 242/375.3; 242/394
(58) Field of Classification Search
   USPC ........... 280/801.2, 802, 806, 807, 801.1, 808; 297/480, 481, 473, 474, 469; 242/374, 242/375.1, 375.3, 379.1, 394
   See application file for complete search history.

(56) References Cited

U.S. PATENT DOCUMENTS

| | | | | |
|---|---|---|---|---|
| 4,213,637 A * | 7/1980 | Mauron | .................. | 280/802 |
| 4,345,780 A * | 8/1982 | Moriya et al. | .............. | 280/802 |
| 4,345,781 A * | 8/1982 | Suzuki et al. | ................. | 280/802 |
| 4,635,963 A * | 1/1987 | Higuchi et al. | ............. | 280/801.1 |
| 4,775,167 A * | 10/1988 | Schiller et al. | ................. | 280/808 |
| 5,123,673 A * | 6/1992 | Tame | .......................... | 280/801.1 |
| 5,141,249 A * | 8/1992 | Saitoh et al. | .................. | 280/804 |
| 5,236,220 A * | 8/1993 | Mills | ........................... | 280/801.1 |
| 5,261,696 A * | 11/1993 | Hamaue | ....................... | 280/802 |
| 5,431,446 A * | 7/1995 | Czarnecki et al. | ............. | 280/802 |
| 6,669,234 B2 * | 12/2003 | Kohlndorfer et al. | ....... | 280/801.1 |
| 6,969,088 B2 * | 11/2005 | Wang | ............................ | 280/802 |
| 7,516,808 B2 * | 4/2009 | Tanaka | ......................... | 180/268 |
| 7,712,785 B2 * | 5/2010 | Ajisaka | ......................... | 280/808 |
| 7,793,982 B2 * | 9/2010 | Krauss | .......................... | 280/806 |
| 7,967,339 B2 * | 6/2011 | Usoro et al. | ................ | 280/801.2 |
| 2010/0001503 A1 * | 1/2010 | Tanaka et al. | ................. | 280/807 |

FOREIGN PATENT DOCUMENTS

| EP | 1655187 A2 * | 5/2006 |
|---|---|---|
| JP | 2008-126880 A | 6/2008 |
| KR | 20-1999-010672 U | 3/1999 |

* cited by examiner

*Primary Examiner* — Ruth Ilan
*Assistant Examiner* — Darlene P Condra
(74) *Attorney, Agent, or Firm* — Morgan, Lewis & Bockius LLP

(57) ABSTRACT

An apparatus for rotating a webbing guide of a seat belt for a vehicle may include a drive unit for moving a cable connected at one end thereof by controlling driving of a motor in response to an actuating signal or a stop signal, the webbing guide connected to the other end of the cable, and hingedly rotated to a first direction of a vehicular body as the cable moves in a second direction, and a return unit provided on the webbing guide, and providing an elastic force to the webbing guide so that the webbing guide hingedly rotated to the first direction of the vehicular body returns to the second direction of the vehicular body when the motor stops driving.

13 Claims, 7 Drawing Sheets

APPARATUS AND CONTROL METHOD FOR ROTATING WEBBING GUIDE OF SEAT BELT FOR VEHICLE

CROSS-REFERENCE TO RELATED APPLICATION

The present application claims priority to Korean Patent Application No. 10-2011-0100997 filed on Oct. 5, 2011, the entire contents of which is incorporated herein for all purposes by this reference.

BACKGROUND OF THE INVENTION

1. Field of the Invention

The present invention relates to an apparatus and control method for rotating a webbing guide of a seat belt for a vehicle, intended to rotate the webbing guide linked to the seat belt depending on whether a door is opened and closed and the seat belt is fastened, thus enabling a convenient seat-belt fastening operation.

2. Description of Related Art

Generally, a seat belt is attached to a seat in a vehicle to hold passenger's body in the event of the collision or sudden braking of a vehicle, thus preventing his or her body from being thrown out of the vehicle and seriously injured.

As shown in FIG. 1, each of a driver's seat and a passenger seat of a vehicle have a pretensioner on a lower end of each of left and right center pillars 1. A seat belt 3 is wound to be retracted from the pretensioner. A belt guide 2 is mounted to an upper end of each of the left and right center pillars 1 to guide the seat belt 3, and a buckle is mounted to a lower portion of the seat in such a way as to be opposite to the pretensioner, so that a belt link of the seat belt 3 is fastened to the buckle.

The seat belt as well as the belt link fitted over the seat belt is located at the upper end adjacent to the belt guide. Thus, when it is required to fasten the seat belt, a passenger bends his or her waist and hands back, holds the seat belt or the belt link, and then fastens the belt link to the buckle.

However, if the front seat is placed in front of the center pillar, so that the belt guide is fixed in back of the front seat, or a driver pulls the seat forward and then seats thereon, the waist and hands must be further bent back to fasten the seat belt, thus inconveniencing a wearer. Particularly, it is more difficult for seniors who become aged bodies, or judged according to traveler's characteristics, disabled persons, pregnant women, or overweight persons to bend by force their waists and hands back, thus causing injuries to the shoulders or waists.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and control method for rotating a webbing guide of a seat belt for a vehicle, intended to rotate the webbing guide linked to the seat belt depending on whether a door is opened and the seat belt is fastened, thus enabling a convenient seat-belt fastening operation.

In an aspect of the present invention, an apparatus for rotating a webbing guide of a seat belt for a vehicle may include a drive unit for moving a cable connected at one end thereof by controlling driving of a motor in response to an actuating signal or a stop signal, the webbing guide connected to the other end of the cable, and hingedly rotated to a first direction of a vehicular body as the cable moves in a second direction, and a return unit provided on the webbing guide, and providing an elastic force to the webbing guide so that the webbing guide hingedly rotated to the first direction of the vehicular body returns to the second direction of the vehicular body when the motor stops driving.

The drive unit may include the motor operated in conjunction with switches for detecting the actuating signal or the stop signal, thus driving or stopping driving, a gear unit having a plurality of gears to be rotated in conjunction with the motor, and a takeup unit coupled to be rotated in conjunction with the gear unit for winding or unwinding the cable.

The actuating signal is either of a signal transmitted from a door switch to the motor when the door is open or a signal transmitted from a buckle switch to the motor when the seat belt is fastened to the buckle, and the stop signal is either of a signal transmitted from the door switch to the motor when the door is closed or a signal transmitted from the buckle switch to the motor when the seat belt is released from the buckle.

The webbing guide may include a rack connected to the other end of the cable to move along with the cable, and a pinion engaging with the rack, wherein the pinion is fixed to a rotating shaft rotatably coupled to the webbing guide, and wherein the return unit is fixed to the rotating shaft to rotate along with the pinion.

The return unit may include a return spring, one end of which is supported by a support bracket secured to the rotating shaft, and the other end is supported by the webbing guide rotatably coupled to the rotating shaft.

A cable connector is mounted to the cable to limit a linear movement of the cable and a rotation of the webbing guide.

The cable connector may include a movable block secured to the cable to linearly move along with the cable, and a stopper limiting a linear movement of the movable block at opposite sides thereof.

The cable connector may include a stopper having a guide hole therein in a longitudinal direction of the cable, and having on opposite ends thereof closing portions to allow the cable to be slidably fitted therethrough, and a movable block accommodated in the guide hole to be moved in the guide hole through the closing portions.

The apparatus may further include the seat belt connected to the webbing guide in such a way as to hingedly rotate, thus preventing twisting thereof when the webbing guide rotates in the first and second directions.

The return unit may include a webbing guide cover connecting the webbing guide and the seat belt.

The return unit may further include a first link linked to an end of the webbing guide, a second link linked to an end of the seat belt, wherein the webbing guide cover is mounted to locate a portion of an intersection between the first and second links therein, and a fastening member passing through the first and second links to be fastened to an outer portion of the webbing guide cover, thus hingedly joining the webbing guide and the seat belt.

In another aspect of the present invention, a control method for rotating a webbing guide of a seat belt for a vehicle may include a door opening step of hingedly rotating the webbing guide to a rear portion of a vehicular body when a door is open and thus an actuating signal is detected, a door closing step of rotating and restoring the webbing guide to a front portion of the vehicular body when the door is closed and thus a stop signal is detected, a seat-belt fastening step of hingedly rotating the webbing guide to the rear portion of the vehicular body when the seat belt is fastened to the buckle and thus the actuating signal is detected, and a seat-belt releasing step of rotating and restoring the webbing guide to the front portion of the vehicular body when the seat belt is released from the buckle and thus the stop signal is detected.

A rotating angle of the webbing guide at the seat-belt fastening step is less than a rotating angle of the webbing guide at the door opening step.

Other aspects and preferred embodiments of the invention are discussed below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
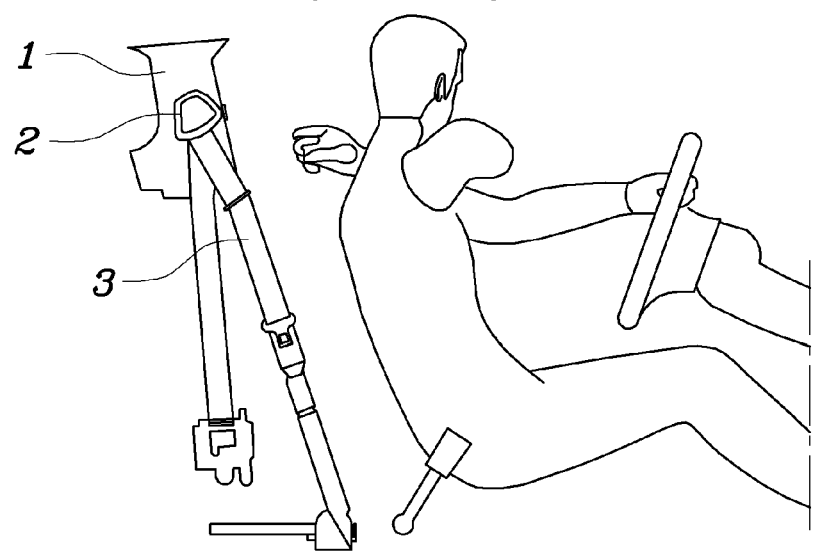
FIG. 1 is a view illustrating a distance difference between a general seat belt structure and a passenger.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The exemplary embodiment of the present invention will be described below in detail with reference to the accompanying drawings.

FIGS. 2 to 11 are views illustrating an apparatus and control method for rotating a webbing guide of a seat belt for a vehicle according to an exemplary embodiment of the present invention.

As shown in FIGS. 2 to 8, the apparatus for rotating the webbing guide largely includes a drive unit 10, a webbing guide 30, and a return spring unit 40.

First, the drive unit 10 functions to linearly move a cable 20 connected at one end thereof by a drive control operation of a motor 12 in response to an actuating signal or a stop signal. The drive unit 10 includes the motor 12, a gear unit 15, and a takeup unit 17.

Figure 2:
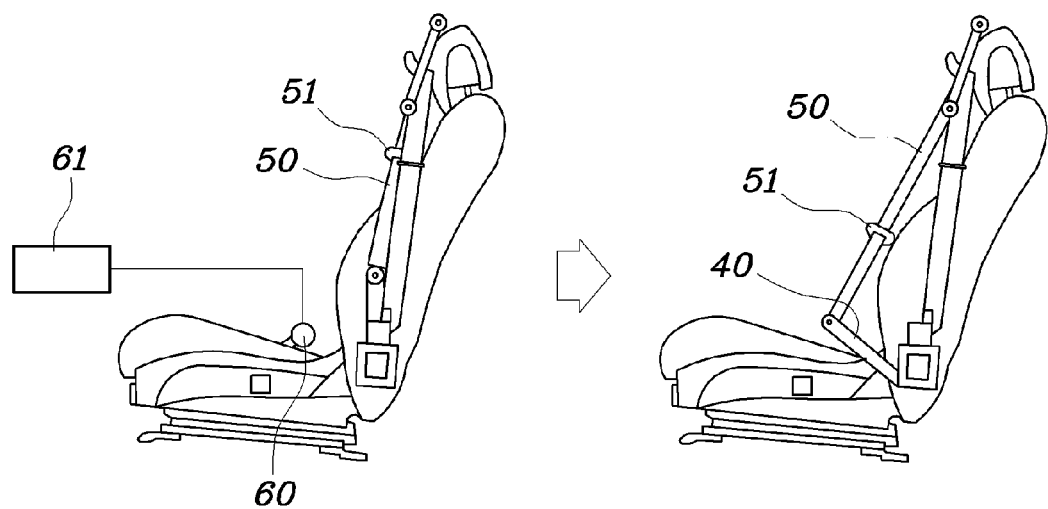
FIG. 2 is a view illustrating positions of a webbing guide when getting into or out of a vehicle and when fastening a seat belt, according to an exemplary embodiment of the present invention.
Figure 3:
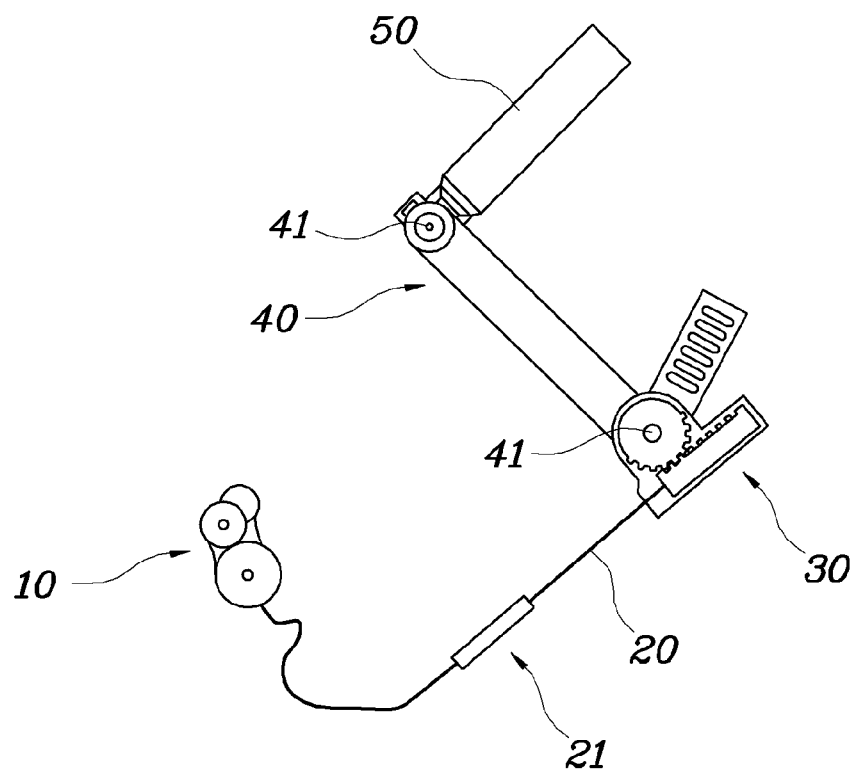
FIG. 3 is a view illustrating a whole structure of an apparatus for rotating the webbing guide according to an exemplary embodiment of the present invention.
Figure 4:
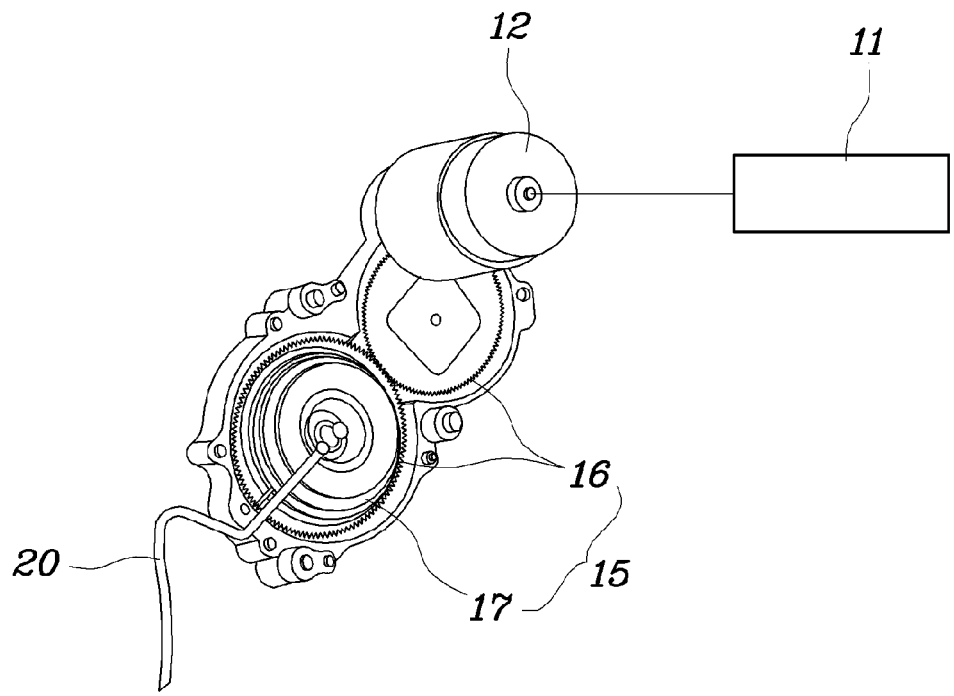
FIG. 4 is a perspective view illustrating a structure of a drive unit according to an exemplary embodiment of the present invention.

Referring to FIGS. 2 to 4, a door switch 11 for detecting a door opening/closing operation is electrically and electronically connected to the motor 12 to be operated in conjunction with the motor 12. When the door is open, the door switch 11 detects an actuating signal, so that the motor 12 is driven. Meanwhile, when the door is closed, the door switch 11 detects a stop signal, so that the motor 12 stops driving.

Further, a buckle switch 61 for detecting an operation of fastening or releasing a seat belt 50 to or from a buckle 60 is electrically and electronically connected to the motor 12 to be operated in conjunction with the motor 12. When the seat belt 50 is fastened to the buckle 60, the buckle switch 61 detects the actuating signal, so that the motor 12 is driven. Meanwhile, when the seat belt 50 is released from the buckle 60, the buckle switch 61 detects the stop signal, so that the motor 12 stops driving.

That is, the actuating signal is either of a signal transmitted from the door switch 11 to the motor 12 when the door is open or a signal transmitted from the buckle switch 61 to the motor 12 when the seat belt 50 is fastened to the buckle 60. The motor 12 is driven in the response to the detected actuating signal.

Further, the stop signal is either of a signal transmitted from the door switch 11 to the motor 12 when the door is closed or a signal transmitted from the buckle switch 61 to the motor 12 when the seat belt 50 is released from the buckle 60. The motor 12 stops driving in the response to the detected stop signal.

Furthermore, the gear unit 15 is coupled to a shaft of the motor 12 to rotate along with the motor 12. Here, the gear unit 15 includes a plurality of gears 16 to engage with a gear connected to the shaft of the motor 12 and thus rotate in conjunction therewith.

The takeup unit 17 protrudes from a surface of any one of the gears 16, which so as to not interfere with the function of the motor 12. The end of the cable 20 is connected to the takeup unit 17 so that the cable 20 is unwound from the takeup unit 17 by the driving operation of the motor 12 or is wound around the takeup unit 17 by the elastic operation of a return spring 43 which will be described below.

The webbing guide 30 includes a rack and pinion apparatus which is connected to the other end of the cable 20, and is hingedly rotated to a rear portion of a vehicular body as the cable 20 moves linearly.

Figure 5:
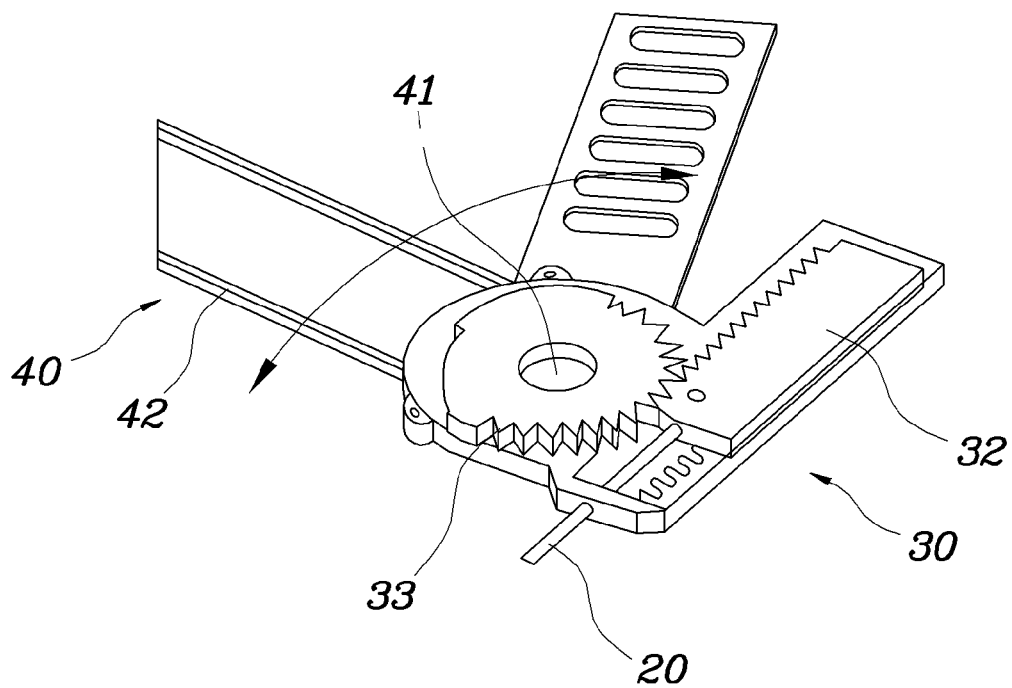
FIG. 5 is a perspective view illustrating a hinge-rotating structure of the webbing guide according to an exemplary embodiment of the present invention.

Referring to FIG. 5, a rack 32 having teeth on a side thereof is connected to the end of the cable 20, so that the rack 32 moves linearly along with the cable 20. In this case, the linear movement of the rack 32 is guided by a guide cover that is mounted to cover an outer portion of the rack 32.

Further, a pinion 33 is coupled to rotatably engage with the teeth formed on a surface of the rack 32. The pinion 33 is rotatably coupled to a rotating shaft 41 coupled to an end of the webbing guide 30. Further, the end of the webbing guide 30 is coupled to the rotating shaft 41 to rotate along with the pinion 33.

That is, when the cable 20 is pulled by the driving operation of the motor 12, the rack 32 connected to the cable 20 slidably moves in a moving direction of the cable 20 along with the cable 20. Simultaneously, the pinion 33 engaging with the rack 32 rotates about the rotating shaft 41, so that the webbing guide 30 secured to the pinion 33 may also hingedly rotate backwards about the rotating shaft 41.

Figure 6:
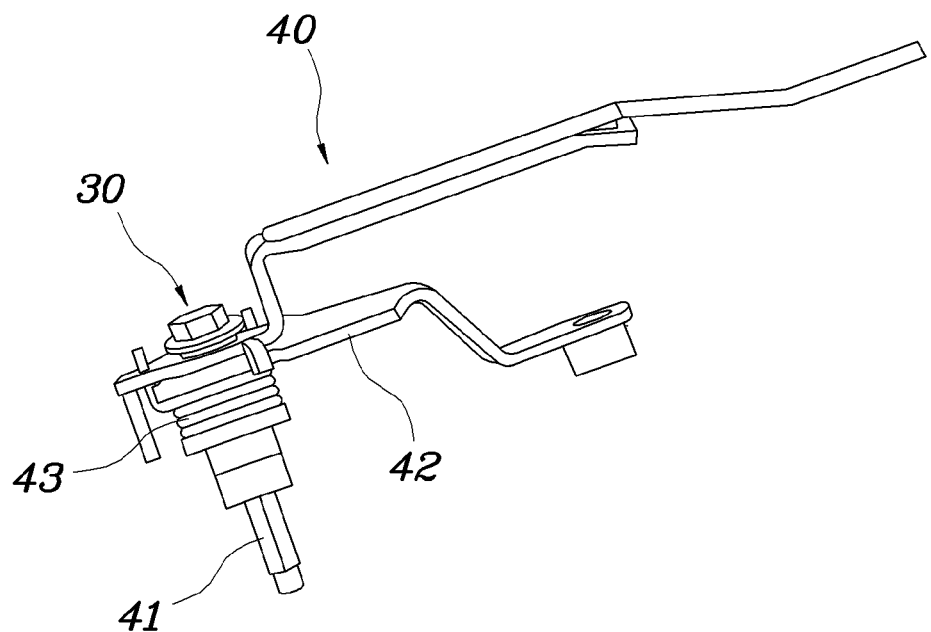
FIG. 6 is a perspective view illustrating a restoration-rotating structure of a return spring according to an exemplary embodiment of the present invention.

A return spring 43 shown in FIG. 6 is fitted over the rotating shaft 41 coupled to the ends of the webbing guide 30, and the return spring unit 40 provides an elastic force so that the webbing guide 30 hingedly rotated to a rear portion of a vehicle returns from the rear portion to the front portion of the vehicular body when the motor 12 stops driving.

Such a return spring 42 may include a coil spring or a torsion spring. One end of the return spring 43 is supported by a support bracket 42 secured to the rotating shaft 41, while the other end is supported by the webbing guide 30 rotatably fitted over the rotating shaft 41. Here, the support bracket 34 is a component that fastens the rotating shaft 41 to a lower portion of a seat for the installation of the webbing guide 30.

That is, if the cable 20 is pulled as the motor 12 is driven, the webbing guide 30 hingedly rotates about a fixed shaft, and simultaneously torsional stress acts on the return spring 43, so that the webbing guide 30 is elastically supported by the elastic force. Thus, when the motor 12 stops driving and thus a force for pulling the cable 20 is eliminated, the cable 20 is untwisted by the elastic force of the return spring 43, so that the webbing guide 30 rotates and returns to a front portion of the vehicle.

Figure 7:
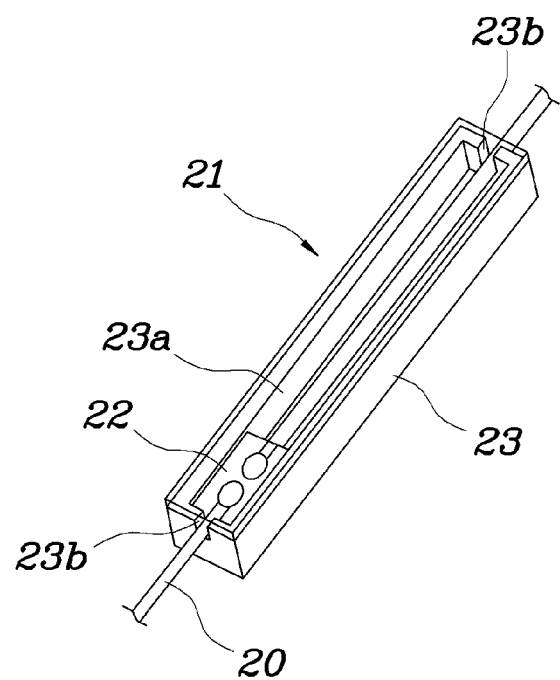
FIG. 7 is a perspective view illustrating a structure of a cable connector according to an exemplary embodiment of the present invention.

Meanwhile, as shown in FIG. 7, a cable connector 21 is provided on a predetermined portion of the cable 20 to limit a rotating angle of the webbing guide 30 as well as a moving section of the cable 20.

Such a cable connector 21 includes a movable block 22 and a stopper 23. The movable block 22 is secured to the cable 20, so that the movable block 22 moves linearly as the cable 20 moves. The stopper 23 is mounted to limit the linear movement of the movable block 22 at opposite sides of the cable 20 in a longitudinal direction thereof.

The stopper 23 is formed to have a shape of a rectangular parallelepiped box. A guide hole 23a is formed in the stopper 23 in the longitudinal direction of the cable 20, the movable block 22 is accommodated in the guide hole 23a in such a way as to move in the guide hole 23a in the longitudinal direction of the cable 20, and closing portions 23b are formed in opposite ends of the stopper 23 to prevent the removal of the movable block 22. The cable 20 is slidably fitted into a lower end of the closing portion 23b. A cover may be further mounted to the front of the stopper 23 to prevent the removal of the movable block 22.

That is, in the state in which the stopper 23 is fixed to the vehicular body, the movable block 22 moves in the stopper 23 along the guide hole 23a formed in the stopper 23, thus limiting the moving section of the cable 20 secured to the movable block 22, and thereby limiting the rotating angle of the webbing guide 30 rotated in conjunction with the cable 20 to a predetermined angle.

Figure 8:
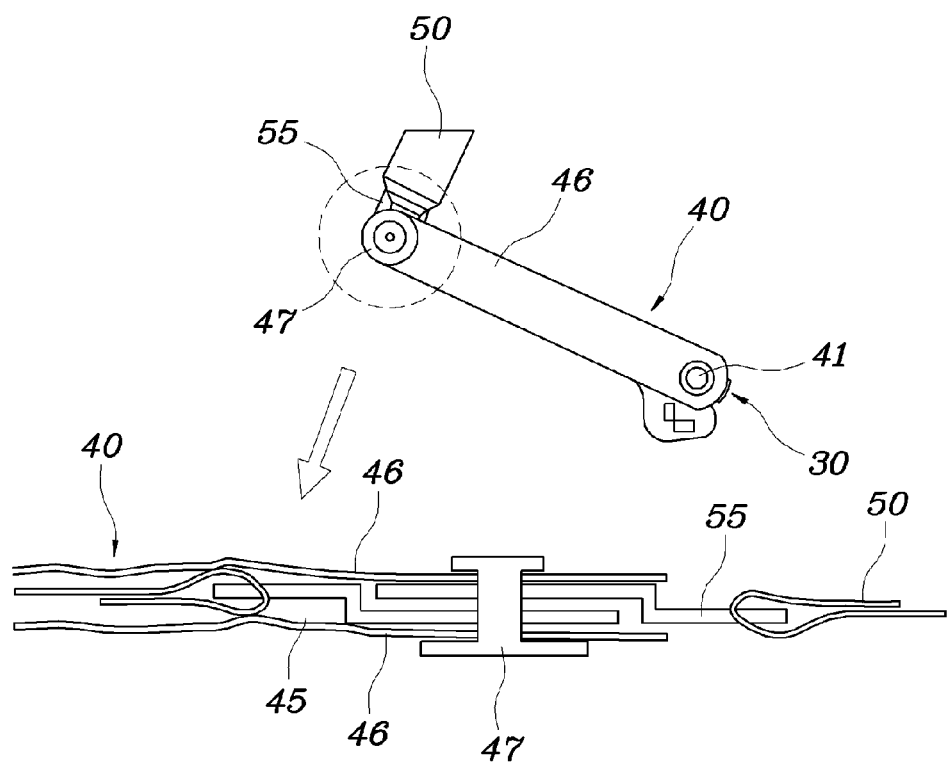
FIG. 8 is a view illustrating a hinge connection structure between the webbing guide and the seat belt according to an exemplary embodiment of the present invention.
Figure 9:
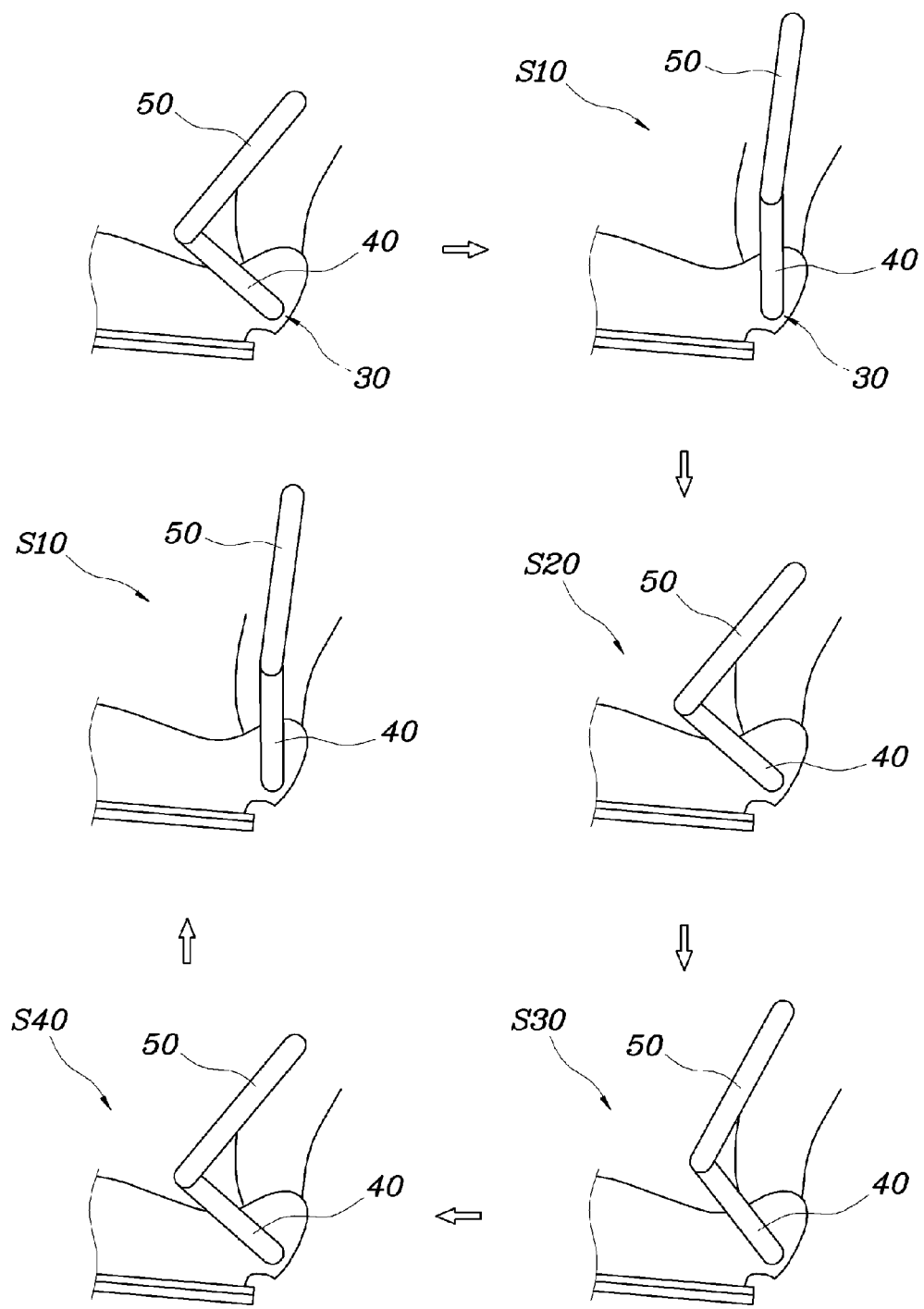
FIG. 9 is a schematic view sequentially illustrating a control method for rotating the webbing guide over time according to an exemplary embodiment of the present invention.
Figure 10:
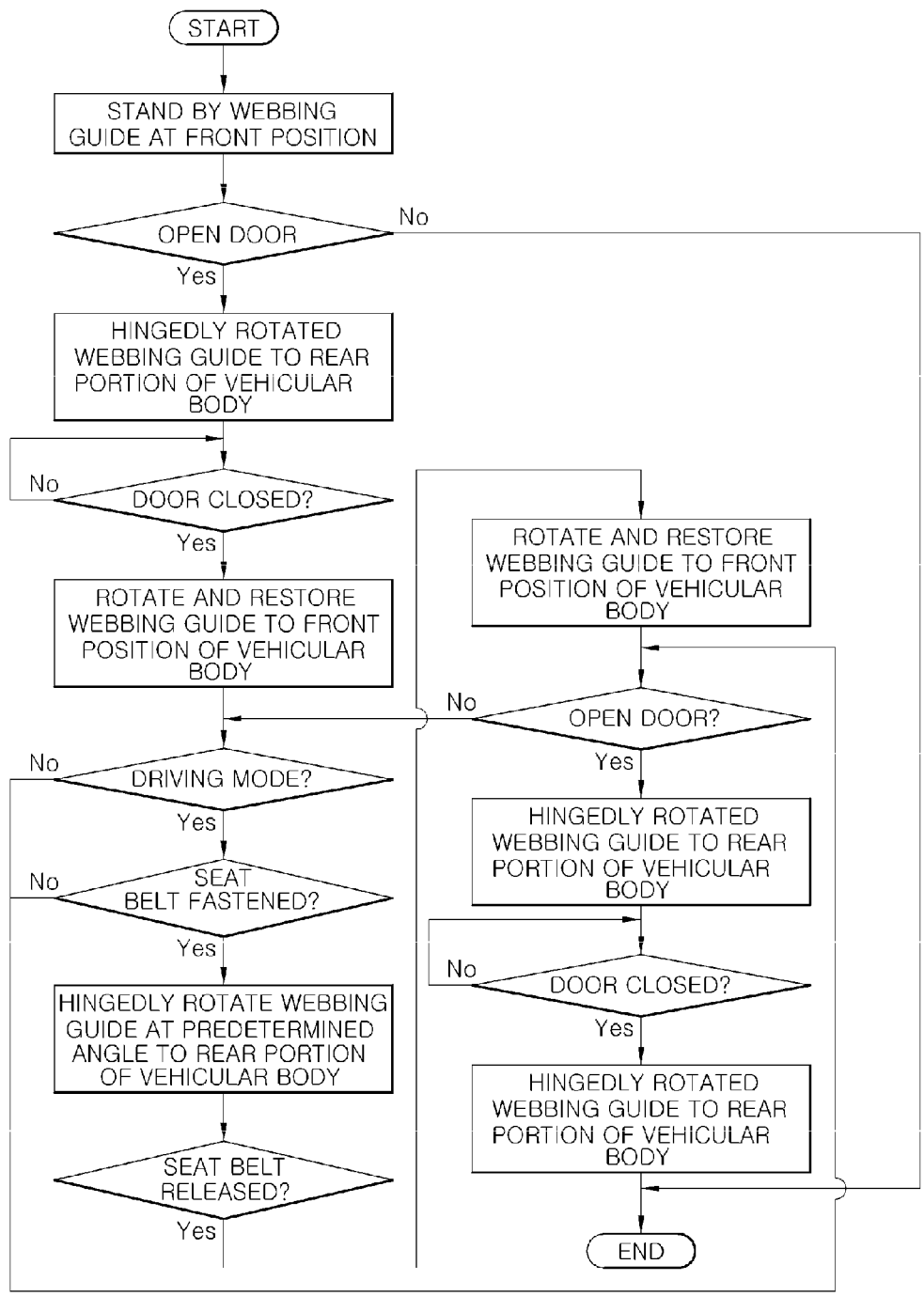
FIG. 10 is a flowchart illustrating the control method for rotating the webbing guide according to an exemplary embodiment of the present invention.

Meanwhile, as shown in FIG. 8, the seat belt 50 is connected to the end of the return spring unit 40 in such a way as to hingedly rotate, thus preventing the seat belt 50 from being twisted when the webbing guide 30 rotates forwards and backwards.

The configuration wherein the webbing guide 30 and the return spring unit 40 are hingedly joined to the seat belt 50 will be described below. A first link 45 is linked to the end of the webbing guide 30, a second link 55 is linked to the end of the seat belt 50, and the outer portion of the return spring unit 40 is covered by a webbing guide cover 46, so that a portion of an intersection between the first link 45 and the second link 55 is located in the webbing guide cover 46.

Further, a fastening member 47 passes through the first and second links 45 and 55 to be fastened thereto. Opposite ends of the fastening member 47 are fastened to the outer portion of the webbing guide cover 46. Here, the fastening member 47 may include riveting or a bolt and a nut and is not limited thereto.

That is, the end of the webbing guide 30 and the end of the seat belt 50 are hingedly fastened to each other via the first link 45 and the second link 55, thus preventing an end of the seat belt 50 connected to the webbing guide 30 from being twisted when the webbing guide 30 rotates to the front or rear portion of the vehicular body.

Further, the fastening member 47 fastened to the first and second links are fastened to the outer portion of the webbing guide cover 46, thus preventing the webbing guide cover 46 from being spread, and minimizing deformation when the webbing guide 30 is hingedly rotated.

Meanwhile, the control method for rotating of the webbing guide according to an exemplary embodiment of the present invention largely includes a door opening step, a door closing step, a seat-belt fastening step and a seat-belt releasing step. The rotating operation of the webbing guide 30 and the return spring unit 40 depending on whether the door is open and closed and the seat belt 50 is worn will be described with reference to FIGS. 9 and 10.

For the convenience of understanding, it is apparent that the rotating operation of the webbing guide 30 will be described over time when a passenger gets into or out of the vehicle and the belt is fastened, and the present invention is not limited to the described operation.

Since an operation performed when the door is normally closed is equal to an operation performed when the stop signal is applied to the motor 12, the webbing guide 30 is in a standby mode to be moved towards the front portion of the vehicular body.

Subsequently, if the passenger opens the door to get into the vehicle, the actuating signal of the door switch 11 according to the door opening is detected to drive the motor 12. As the motor 12 is driven, the webbing guide 30 is hingedly rotated to the rear portion of the vehicular body at step S10.

Further, if the door is closed after the passenger gets on the vehicle, the stop signal of the door switch 11 according to the door closing is detected to stop driving the motor 12. As the motor 12 stops driving, the return spring 43 provides the elastic force to the webbing guide 30, so that the webbing guide 30 is hingedly rotated to the front portion of the vehicular body at step S20.

Subsequently, in a driving mode where the vehicle may be operated, the motor 12 is controlled to be on or off depending on whether the seat belt 50 is fastened, thus hingedly rotating the webbing guide 30 to the front or rear portion of the vehicle. However, if necessary, the webbing guide 30 can be hingedly rotated to the front or rear portion of the vehicle depending on whether the seat belt 50 is fastened or not regardless of the driving mode of the vehicle.

Herein, only the case where the vehicle is in driving mode will be described.

When the vehicle is in driving mode, if a passenger inserts the belt link 51 connected to the seat belt 50 into the buckle 60, the actuating signal of the buckle switch 61 is according to the seat belt insertion is detected to drive the motor 12. As the motor 12 is driven, the webbing guide 30 is hingedly rotated to the rear portion of the vehicular body at step S30.

At this time, the rotating angle of a hinge of the webbing guide 30 in the case of fastening the seat belt 50 is less than the rotating angle in the case of opening the door, thus reducing a space between the seat belt 50 and a passenger and thereby causing the seat belt 50 to come into close contact with his or her body.

That is, assuming that the webbing guide 30 is located at an angle of 45° with respect to an imaginary horizontal plane thereunder at the door closing step S20, the webbing guide 30 may be hingedly rotated towards the rear portion at an angle of about 85 to 110° with respect to the imaginary horizontal plane at the door opening step S10, and the webbing guide 30 may be hingedly rotated towards the rear portion at an angle of about 50~80° with respect to the imaginary horizontal plane at the seat-belt fastening step S30.

At the seat-belt fastening step S30, the backward rotating angle of the webbing guide 30 may be freely changed according to several conditions including a passenger's physical condition and a seat structure. The present invention is sufficient as long as it may reduce the space between the passenger and the seat belt 50, and the rotation of the webbing guide 30 according to an exemplary embodiment of the present invention is not limited to the above rotating angle.

Meanwhile, if a passenger releases the belt link 51 from the buckle 60, the stop signal of the buckle switch 61 according to the buckle releasing is detected to stop driving the motor 12. As the motor 12 stops driving, the return spring 43 provides elastic force to the webbing guide 30 so that the webbing guide 30 is hingedly rotated to the front portion of the vehicular body at step S40.

Afterwards, if the passenger opens the door to get out of the vehicle, the actuating signal of the door switch 11 according the door opening is detected to drive the motor 12. By the driving operation of the motor 12, the webbing guide 30 is hingedly rotated to the rear portion of the vehicular body at step S10.

Further, if the door is closed after the passenger gets out of the vehicle, the stop signal of the door switch 11 is according to the door closing is detected to stop driving the motor 12. As the motor 12 stops driving, the return spring 43 provides the elastic force to the webbing guide 30, so that the webbing guide 30 is hingedly rotated to the front portion of the vehicular body and thereby the webbing guide 30 is in first standby mode.

Figure 11:
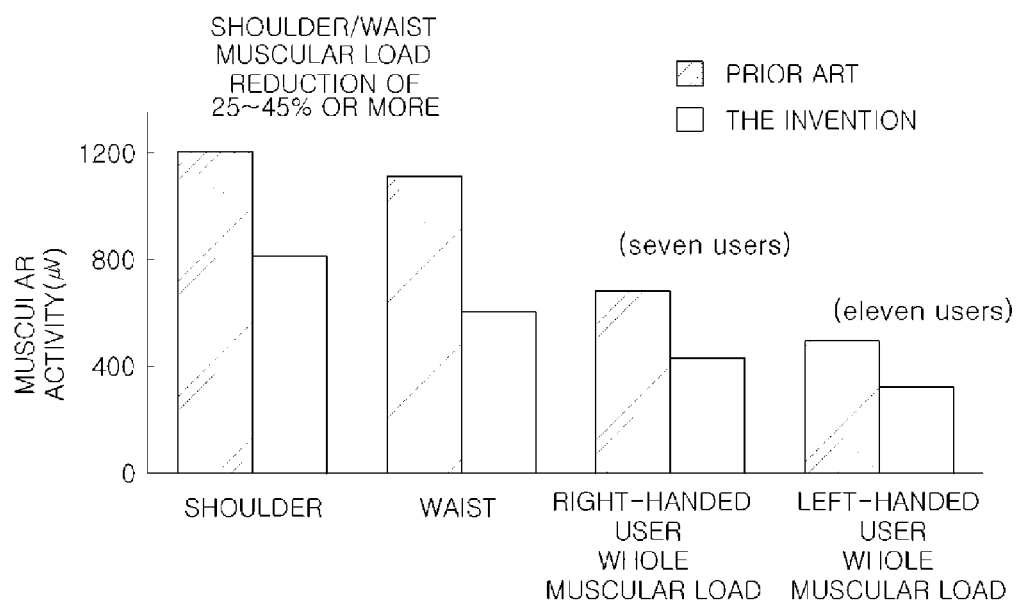
FIG. 11 a graph illustrating results of experiment in muscular load when a person uses the seat belt of the present invention and a conventional seat belt.

FIG. 11 shows the results of experiment in muscular load for shoulders/waist or whole muscular load of the seat belt using the apparatus for rotating the webbing guide 30 of the present invention and the conventional seat belt, in a test group of 18 people over the age of 65. When comparing the seat belt using the apparatus for rotating the webbing guide 30 of the present invention with the conventional seat belt, it can be seen from the results of experiment that the seat belt of this invention considerably reduces a load acting on the muscles of the whole body as well as the shoulders and waist.

As apparent from the above description, the present invention is advantageous in that a webbing guide connected to a seat belt is hingedly rotated to a front or rear portion of a vehicle in conjunction with an operation of opening or closing a door, so that the seat belt is hingedly rotated forwards or backwards along with the webbing guide. Thus, a passenger can get in or out without interference by the webbing guide. Particularly in the case of fastening the seat belt, it can be comfortably fastened without straining a passenger's body.

Further, the present invention is advantageous in that a webbing guide connected to a seat belt is hingedly rotated to a front or rear portion of a vehicle in conjunction with a seat-belt fastening operation, thus preventing the fastened seat belt from becoming loose, and making the seat belt come into close contact with a passenger, thereby improving safety when the seat belt is fastened.

Furthermore, the present invention is advantageous in that a seat belt is hingedly joined to a webbing guide, thus preventing the seat belt from being twisted while the webbing guide is hingedly rotated, thereby allowing the seat belt to be conveniently used without operational interference by the webbing guide.

For convenience in explanation and accurate definition in the appended claims, the terms "upper", "lower", "inner", "outer", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for rotating a webbing guide of a seat belt for a vehicle comprising:

a drive unit for moving a cable connected at one end thereof by controlling driving of a motor in response to an actuating signal or a stop signal;

the webbing guide connected to the other end of the cable, and hingedly rotated to a first direction of a vehicular body as the cable moves in a second direction; and a return unit provided on the webbing guide, and providing an elastic force to the webbing guide so that the webbing guide hingedly rotated to the first direction of the vehicular body returns to the second direction of the vehicular body when the motor stops driving.

2. The apparatus of claim 1, wherein the drive unit includes:
- the motor operated in conjunction with switches for detecting the actuating signal or the stop signal, thus driving or stopping driving;
- a gear unit having a plurality of gears to be rotated in conjunction with the motor; and
- a takeup unit coupled to be rotated in conjunction with the gear unit for winding or unwinding the cable.

3. The apparatus of claim 1, wherein the actuating signal is either of a signal transmitted from a door switch to the motor when the door is open or a signal transmitted from a buckle switch to the motor when the seat belt is fastened to the buckle, and the stop signal is either of a signal transmitted from the door switch to the motor when the door is closed or a signal transmitted from the buckle switch to the motor when the seat belt is released from the buckle.

4. The apparatus of claim 1, wherein the webbing guide includes:
- a rack connected to the other end of the cable to move along with the cable; and
- a pinion engaging with the rack,
- wherein the pinion is fixed to a rotating shaft rotatably coupled to the webbing guide, and
- wherein the return unit is fixed to the rotating shaft to rotate along with the pinion.

5. The apparatus of claim 4, wherein the return unit includes a return spring, one end of which is supported by a support bracket secured to the rotating shaft, and the other end is supported by the webbing guide rotatably coupled to the rotating shaft.

6. The apparatus of claim 1, wherein a cable connector is mounted to the cable to limit a linear movement of the cable and a rotation of the webbing guide.

7. The apparatus of claim 6, wherein the cable connector includes:
- a movable block secured to the cable to linearly move along with the cable; and
- a stopper limiting a linear movement of the movable block at opposite sides thereof.

8. The apparatus of claim 6, wherein the cable connector includes:
- a stopper having a guide hole therein in a longitudinal direction of the cable, and having on opposite ends thereof closing portions to allow the cable to be slidably fitted therethrough; and
- a movable block accommodated in the guide hole to be moved in the guide hole through the closing portions.

9. The apparatus of claim 1, further including the seat belt connected to the webbing guide in such a way as to hingedly rotate, thus preventing twisting thereof when the webbing guide rotates in the first and second directions.

10. The apparatus of claim 9, wherein the return unit includes a webbing guide cover connecting the webbing guide and the seat belt.

11. The apparatus of claim 10, wherein the return unit further includes:
- a first link linked to an end of the webbing guide;
- a second link linked to an end of the seat belt, wherein the webbing guide cover is mounted to locate a portion of an intersection between the first and second links therein, and
- a fastening member passing through the first and second links to be fastened to an outer portion of the webbing guide cover, thus hingedly joining the webbing guide and the seat belt.

12. A control method for rotating a webbing guide of a seat belt for a vehicle comprising:
- a door opening step of hingedly rotating the webbing guide to a rear portion of a vehicular body when a door is open and thus an actuating signal is detected;
- a door closing step of rotating and restoring the webbing guide to a front portion of the vehicular body when the door is closed and thus a stop signal is detected;
- a seat-belt fastening step of hingedly rotating the webbing guide to the rear portion of the vehicular body when the seat belt is fastened to the buckle and thus the actuating signal is detected; and
- a seat-belt releasing step of rotating and restoring the webbing guide to the front portion of the vehicular body when the seat belt is released from the buckle and thus the stop signal is detected.

13. The control method of claim 12, wherein a rotating angle of the webbing guide at the seat-belt fastening step is less than a rotating angle of the webbing guide at the door opening step.

* * * * *